(12) United States Patent
Hasunuma et al.

(10) Patent No.: US 11,305,427 B2
(45) Date of Patent: Apr. 19, 2022

(54) ROBOT SYSTEM AND ROBOT CONTROL METHOD

(71) Applicant: KAWASAKI JUKOGYO KABUSHIKI KAISHA, Kobe (JP)

(72) Inventors: Hitoshi Hasunuma, Kobe (JP); Masayuki Enomoto, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 73 days.

(21) Appl. No.: 16/954,114

(22) PCT Filed: Nov. 28, 2018

(86) PCT No.: PCT/JP2018/043700
§ 371 (c)(1),
(2) Date: Jun. 15, 2020

(87) PCT Pub. No.: WO2019/116891
PCT Pub. Date: Jun. 20, 2019

(65) Prior Publication Data
US 2020/0353620 A1    Nov. 12, 2020

(30) Foreign Application Priority Data

Dec. 15, 2017    (JP) .............................. JP2017-240252

(51) Int. Cl.
*B25J 9/16*    (2006.01)
*B25J 19/02*    (2006.01)

(52) U.S. Cl.
CPC ........... *B25J 9/1664* (2013.01); *B25J 9/1653* (2013.01); *B25J 9/1697* (2013.01); *B25J 19/023* (2013.01)

(58) Field of Classification Search
CPC ...... B25J 9/1664; B25J 9/1653; B25J 9/1697; B25J 19/023; B25J 9/161; G05B 19/0426
See application file for complete search history.

(56) References Cited

U.S. PATENT DOCUMENTS 9,008,841 B2 *    4/2015    Fuhlbrigge ............ B25J 9/1687
                                                                        700/253
2015/0120055 A1    4/2015    Miyazawa et al.
(Continued)

FOREIGN PATENT DOCUMENTS

JP    2003-211382 A    7/2003
JP    2009-237710 A    10/2009
(Continued)

OTHER PUBLICATIONS

Feb. 19, 2019 Search Report issued in International Patent Application No. PCT/JP2018/043700.

*Primary Examiner* — Robert T Nguyen
(74) *Attorney, Agent, or Firm* — Oliff PLC (57) ABSTRACT

A robot system includes a robot, an image acquisition part, an image prediction part, and an operation controller. The image acquisition part acquires a current image captured by a robot camera arranged to move with the end effector. The image prediction part predicts a next image to be captured by the robot camera based on a teaching image model and the current image. The teaching image model is constructed by a machine learning of teaching image which is predicted to capture by the robot camera while the movable part performs an adjustment operation. The operation controller calculates the command value for operating the movable part so that the image captured by the robot camera approaches the next image, and controls the movable part based on the command value.

9 Claims, 6 Drawing Sheets (56) References Cited

U.S. PATENT DOCUMENTS

| | | | | |
|---|---|---|---|---|
| 2017/0334066 A1* | 11/2017 | Levine | .................. | G06V 10/82 |
| 2019/0251437 A1* | 8/2019 | Finn | ...................... | G06N 3/008 |
| 2019/0364242 A1* | 11/2019 | Hayashi | ............ | H04N 21/8455 |
| 2020/0269448 A1* | 8/2020 | Ooba | ..................... | B25J 9/1697 |
| 2021/0012510 A1* | 1/2021 | Zhao | ..................... | G06V 10/40 |

FOREIGN PATENT DOCUMENTS

| | | |
|---|---|---|
| JP | 2010-250469 A | 11/2010 |
| JP | 2012-061587 A | 3/2012 |
| JP | 2013-158847 A | 8/2013 |
| JP | 2015-085458 A | 5/2015 |

* cited by examiner

ROBOT SYSTEM AND ROBOT CONTROL METHOD

TECHNICAL FIELD

The present invention mainly relates to a robot system for controlling a robot.

BACKGROUND ART

Generally, in order to cause a robot to perform a predetermined operation in a facility such as a plant, a program describing the operation to be performed by the robot at a timing of the operation needs to be prepared in advance.

PLT 1 discloses a robot control device for performing an operation to grip a workpiece to a robot arm in a manner called a visual servo. A camera is attached to the robot arm of PTL 1. An image acquired by the camera of the robot arm at the position and the direction where the robot arm holds the workpiece is a target data. Then, feedback control of the position and the direction of the robot arm is performed so that the image acquired by the camera of the robot arm at the operation is the same as the target data acquired in advance. This enable the robot arm to set the target position and the target direction.

CITATION LIST

Patent Literature

PTL 1: Japanese Patent Application Laid-Open No. 2003-211382

SUMMARY OF INVENTION

Technical Problem

However, it is required that a person skilled in a robot operation, a program, and the like take a long time to create a program describing an operation to be performed by the robot in advance. In addition, the configuration of PTL 1 does not specify how the robot arm is moved to match the target position and the target direction. Therefore, it may not be possible to flexibly deal with environmental changes.

The present invention has been made in view of the circumstances described above, and a primary object of the present invention is to provide a robot system being able to reduce labor of program of teaching a robot operation and deal with environmental changes.

Solution to Problem

Problems to be solved by the present invention are as described above. Solutions to the problems and advantageous effects thereof will now be described.

A first aspect of the present invention provides a robot system as follows. The robot system includes a robot, an image acquisition part, an image prediction part, and an operation controller. The robot includes an operation tool and a movable part. The movable part performs an adjustment operation for adjusting at least one of a position and a direction of the operation tool while the operation tool performs an operation to a workpiece. The image acquisition part acquires a current image which is an image captured by an imaging device. The imaging device is arranged so that the imaging device moves with the operation tool or the imaging device can image an area including the operation tool. The image prediction part predicts a next image which is an image to be captured by the imaging device based on a teaching image model and the current image. The teaching image model is constructed by a machine learning of a teaching image which is predicted to capture by the imaging device while the movable part performs the adjustment operation. The operation controller calculates a command value for moving the movable part so that the image captured by the imaging device approaches the next image. The operation controller controls the movable part based on the command value.

A second aspect of the present invention provides a method for controlling a robot as follows. The robot includes an operation tool and a movable part. The movable part performs an adjustment operation for adjusting at least one of a position and a direction of the operation tool while the operation tool performs an operation to a workpiece. The method for controlling the robot includes an image acquisition process, an image prediction process, and an operation control process. In the image acquisition process, a current image which is an image captured by an imaging device is acquired. The imaging device is arranged so that the imaging device moves with the operation tool or the imaging device can image an area including the operation tool. In the image prediction process, a next image which is an image to be captured by the imaging device is predicted based on a teaching image model and the current image, the teaching image model being constructed by a machine learning of a teaching image which is predicted to capture by the imaging device while the movable part performs the adjustment operation. In the operation control process a command value for moving the movable part is calculated so that the image captured by the imaging device approaches the next image and the movable part is controlled based on the command value.

This enables to teach the robot using the teaching image. Therefore, it is possible to eliminate the need for a program related to the teaching of the robot operation, and to reduce the labor of the program. In addition, since the next image is predicted from the current image based on the teaching image models obtained by the machine learning, rather than operating the robot as determined in advance, it is possible to flexibly cope with environmental changes.

Advantageous Effects of Invention

According to the present invention, it is possible to realize a robot system being able to reduce labor of program of teaching a robot operation and flexibly deal with environmental changes.

DESCRIPTION OF EMBODIMENTS

Figure 1:
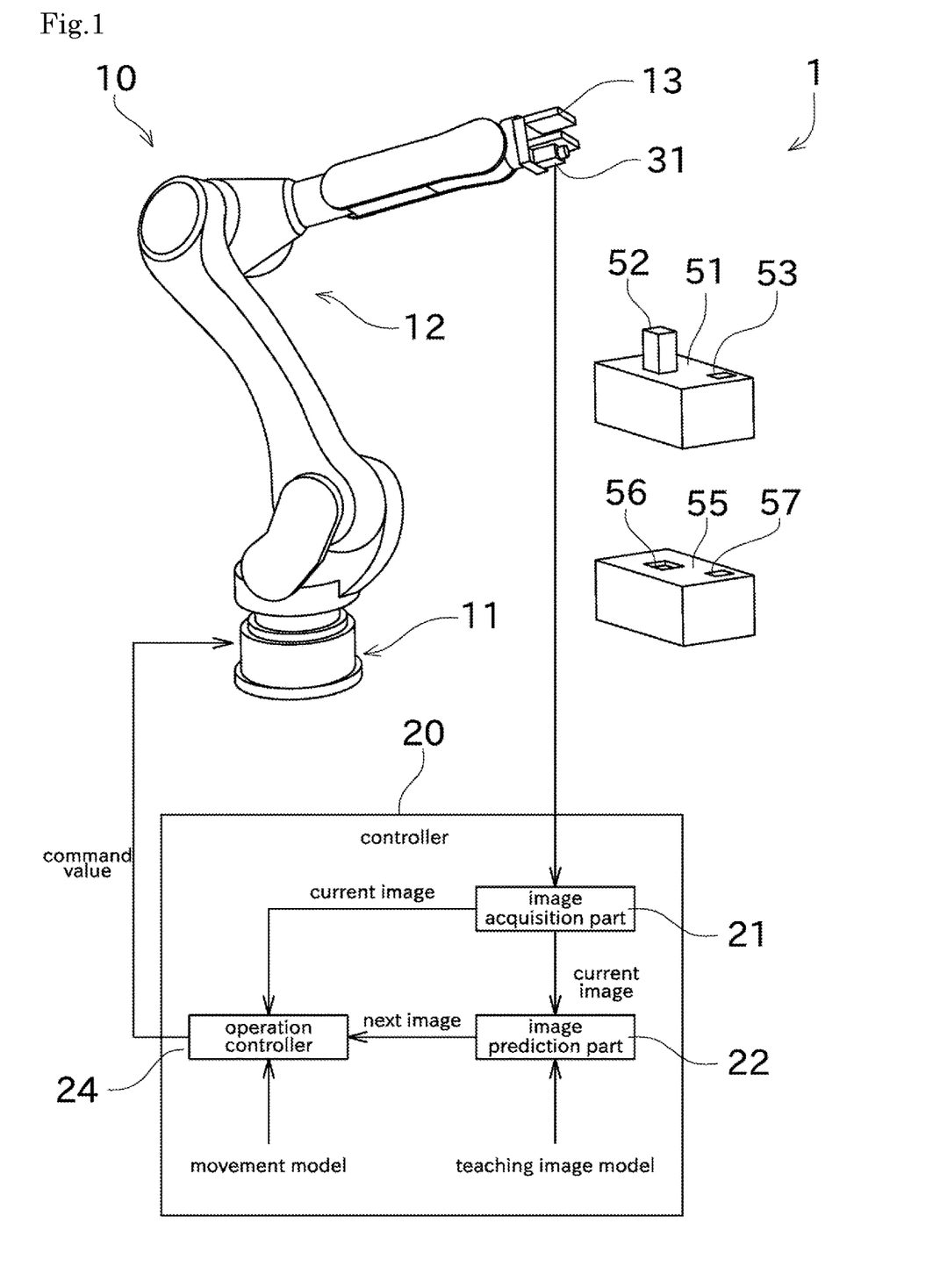
FIG. 1 A block diagram showing a configuration of a robot system according to a first embodiment.

Embodiments of the present invention will be described with reference to the drawings. First, referring to FIG. 1, a schematic configuration of a robot system 1 will be described. FIG. 1 is a block diagram showing the configuration of the robot system 1 according to the first embodiment.

The robot system 1 is installed in a factory or the like that handles transportation machineries, electric appliances, or other products. The robot system 1 includes a robot 10 and a controller 20. The controller 20 controls the robot 10 based on the content taught by the person to perform various operation. As an operation to be performed by the robot 10, for example, the operation such as moving, welding, painting, and assembling a workpiece which is an object of the operation.

As shown in FIG. 1, the robot 10 includes a support part 11, a movable part 12, an end effector (operation tool) 13.

The support part 11 is a member that functions as a base of the movable part 12, the end effector 13, and the like and fixed to a floor or the like.

The movable part 12 has arms connected to each other by a joint respectively, and each joint is provided with an actuator. By adjusting the driving force applied to each actuator, each arm rotates by a desired angle at a desired speed. Thus, the position and the direction (posture) of the end effector 13 can be adjusted. It is referred to as an adjustment operation to adjust the position and the direction of the end effector 13 in order to perform the operation of the robot 10 (the end effector 13).

The end effector 13 is a part having a function of acting directly on the workpiece and is mounted on the distal end of the movable part 12. The mounted end effector 13 has various types. For example, the end effector 13 may be a gripper, a multi-finger hand, or the like. Wiring, tubing, or the like connected to the end effector 13 from the electric motor, the control device, or the like are arranged along the longitudinal direction of the movable part 12. Thus, driving force or electric signaling is transmitted to the end effector 13.

The movable part 12 is provided with a robot camera 31. The robot camera 31 is so called a high-speed camera and can perform imaging at shorter time intervals than common cameras. The imaging interval of the robot camera 31 of the present embodiment is 1 msec (millisecond) to 2 msec, but may be 10 msec or less, 5 msec or less, or 1 msec or less.

In the robot system 1 of the present embodiment, the adjustment operation is performed by operating the movable part 12 based on the image captured by the robot camera 31 attached to the movable part 12. In the present embodiment, the robot camera 31 is attached to the most distal end of the movable part 12 (the portion where the end effector 13 is attached). Therefore, if the position and the direction of the end effector 13 is changed, the position and the direction of the robot camera 31 changes accordingly, the image to be imaged changes. Detailed usage of the image captured by the robot camera 31 will be described later. The robot camera 31 may be attached to the proximal end side (the support part 11 side) than the portion where the end effector 13 is attached.

The controller 20 is the configuration by a known computer and includes the configuration such as a CPU, a ROM, a RAM, and a HDD. Various programs are stored in the HDD or the like. The controller 20 performs various controls related to the robot 10 by the CPU reading and executing this program into a RAM or the like. Thus, the controller 20 can exhibit functions as an image acquisition part 21, an image prediction part 22, and an operation controller 24. The functions of each part will be described later. In addition to these functions, the controller 20 has a function of operating the movable part 12 and the end effector 13, and a function of performing the machine learning to be described later.

Next, a prior process (in particular, a prior process with respect to the movable part 12) for causing the robot system 1 to perform the operation will be described. In the robot system 1 of this embodiment, as the prior process, it is required to perform the first prior treatment to construct the teaching image model by the machine learning and the second prior treatment to construct the movement model by the machine learning. First, referring to FIGS. 2 to 4, the first prior treatment will be described.

First, the operation performed by the robot system 1 in the present embodiment will be briefly described. In the present embodiment, the robot system 1 performs the operation for moving the workpiece 52. Specifically, as shown in FIG. 1, the end effector 13 grips the workpiece 52 placed on the first the workpiece base 51 and the end effector 13 places the workpiece 52 on a workpiece placing surface 56 of the second the workpiece base 55 provided in another position.

The first prior treatment is a treatment for imaging an image that is predicted to be captured by the robot camera 31 during the operation as the teaching image and constructing the teaching image model by performing the machine learning based on the teaching image. In this embodiment, the teaching image is imaged without actually moving the robot 10. As a result, the teaching image can be imaged with a simple process.

Figure 3:
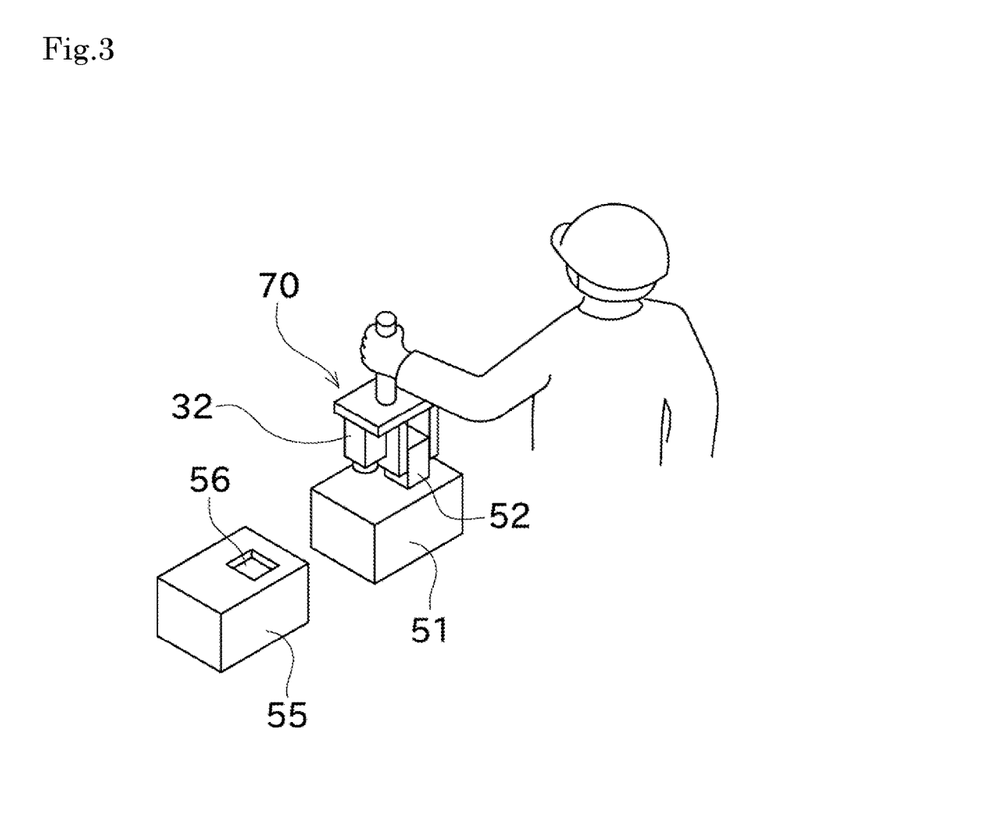
FIG. 3 A perspective view showing a person obtaining teaching images using a teaching tool.

Specifically, as shown in FIG. 3, a teaching tool 70 simulating the end effector 13 of the robot 10 is used. FIG. 3 is a perspective view showing a state in which a teaching operator acquires the teaching image by using the teaching tool 70. The teaching tool 70 is provided with a teaching camera 32 in the same position (corresponding position) as the robot 10. The teaching camera 32 is the high-speed camera similarly to the robot camera 31, it is preferable that the time interval of imaging is also comparable. The teaching images are imaged by the teaching camera 32.

The teaching operator grasps the teaching tool 70 and causes the teaching camera 32 to image images while changing the position and the direction of the teaching tool 70 according to the operation procedures to be performed by the robot 10. The images captured by the teaching camera 32 while changing the position and the direction of the teaching tool 70 are the teaching images. That is, the teaching image is an image realized by the teaching operator movement of the image captured when the robot camera 31 mounted on the robot 10 is the operation. The number of the teaching image to be imaged may be one, but is preferably a plurality.

Figure 2:
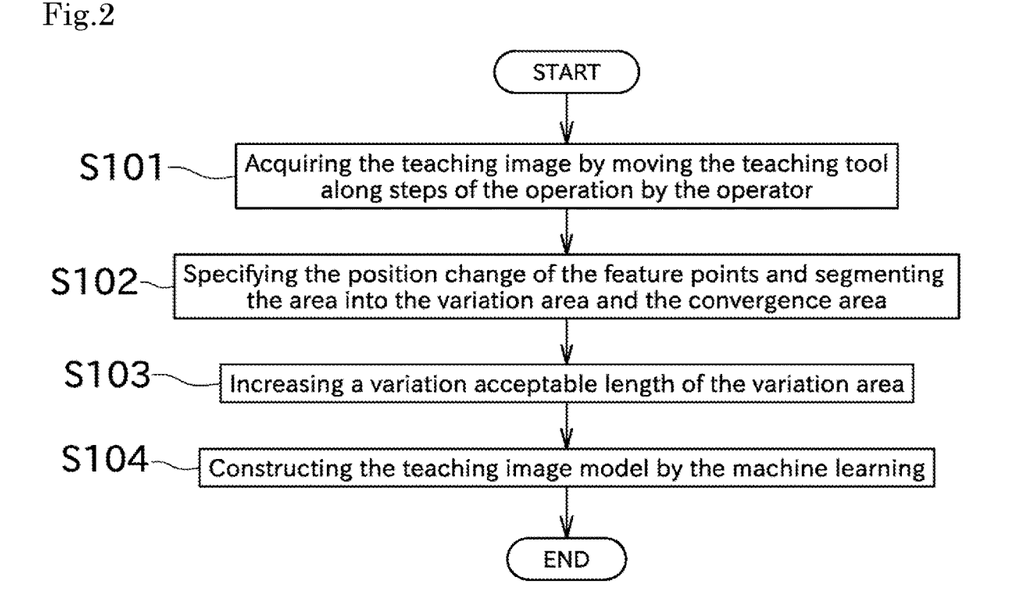
FIG. 2 A flow chart showing processes of constructing a teaching image model.

The teaching image captured using the teaching tool 70 is acquired by the controller 20 using a radio network, a wired network, a storage medium, or the like (S101 of the flow chart of FIG. 2). The controller 20 performs a process by using feature points (minutiae) of the teaching images in which the position of the feature points are changed according to the operation of the teaching tool 70 (that is, the operation of the robot 10 during the operation). In the present embodiment, the controller 20 performs the process by using the edges of the workpiece 52, the first marker 53 provided on the first workpiece table 51, and the second marker 57 provided on the workpiece 52 as a feature point.

Figure 4:
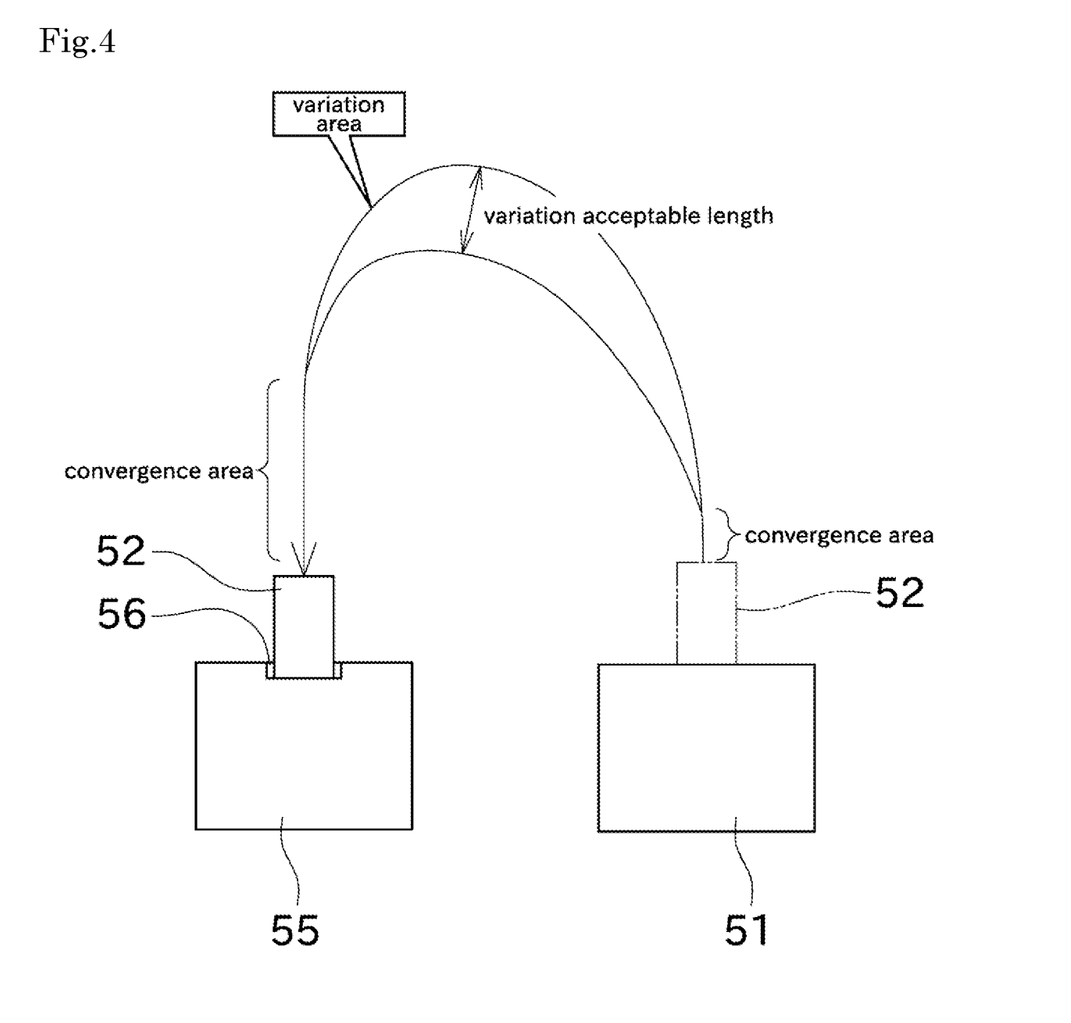
FIG. 4 A schematic diagram showing a variation area, a convergence area, and a variation acceptable length.

Specifically, the controller 20 specifies the position change of the feature points in accordance with the operation procedure and specifies the operation status, the degree of progress, and the like based on the specified result. The controller 20 segments the area to be subjected to the position control in the operation procedure into a variation area and a convergence area (S102). Hereinafter, the variation area and the convergence area will be described with reference to FIG. 4. FIG. 4 is a schematic diagram showing the variation area, the convergence area, and the variation acceptable length.

The operation performed by the robot 10 includes a step in which the position and the direction is to be precisely controlled (hereinafter, the precision process) and a step in which the position and the direction is not required to be precisely controlled (hereinafter, the normal process). For example, in the operation of the present embodiment, in the step of grasping the workpiece 52, if the position and the direction is only slightly shifted, the workpiece 52 cannot be grasped or the tip of the end effector 13 contacts the workpiece 52. Therefore, the step of grasping the workpiece 52 corresponds to the precision process. On the other hand, in the process of moving the gripped workpiece 52 to the vicinity of the workpiece placing surface 56, problems do not occur even if the position and the direction is deviated to some extent. Therefore, this step corresponds to the normal process. In the step of placing the workpiece 52 on the workpiece placing surface 56, if the position and the direction is only slightly shifted, the workpiece cannot be placed on the workpiece placing surface 56. Therefore, this step corresponds to the precision process. Hereinafter, areas are segmented into the convergence area and the variation area so that an area where the position control is performed in the precision process is the convergence area and an area where the position control is performed in the normal process is the variation area.

However, since the controller 20 cannot directly determine which timing is the precision process or the normal process, it is classified as the convergence area or the variation area based on the teaching images. In particular, the teaching operator is expected to behave in a similar manner each time in the precision process. Therefore, in the precision process, the positions of the feature point are similar in a plurality of the teaching image (the coincidence degree of the feature point is high). It is also envisaged that the teaching operator will move the teaching tool 70 carefully in the precision process. Therefore, the precision process slows down the position change of the feature point. Thus, the controller 20 determines that the higher the coincidence degree of the feature point or the slower the position change of the feature point, the more likely it is to be the precision process (i.e., the convergence area). It should be noted that this determination can be made only for either the coincidence degree of the feature point or the position change rate. Thus, the controller 20 can divide the area where the position control is performed in the operation process into the convergence area and the variation area.

The controller 20 increase a variation acceptable length of the area segmented to the variation area (S103). The variation acceptable length is an acceptable (allowable) range even if a deviation occurs while performing the position control. A process to increase the variation acceptable length of the convergence area is not performed. Alternatively, instead of or in addition to process of S103, a process to reduce the variation acceptable length of the convergence area may be performed. Thus, in the precision process, where accuracy is required, the position and the direction of the end effector 13 is precisely controlled, so that the chance of the operation failure can be reduced. On the other hand, in the normal process, where accuracy is not required, positional deviation or the like is easily allowed. For example, even when an environmental change or the like occurs, it is possible to flexibly cope with the change as long as it is within the variation acceptable length range. In the present embodiment, the areas are divided into two areas, the convergence area and the variation area, but the areas may be divided into three or more areas.

The teaching images also include images which are expected to be imaged by the robot camera 31 in the operation stream. In addition, the teaching images also include an information of change tendency which indicate what the image is captured next to the image captured by the robot camera 31 at a certain timing. Therefore, by performing the machine learning of the teaching images, a teaching image model can be constructed, in the teaching image model, the most recently captured image by the robot camera 31 (a current image) is an input and an image should be imaged by the robot camera 31 (a next image) is an output (S104). The next image is, in other words, the image that the robot camera 31 should acquire at the next time when operation progresses properly. As a technique for the machine learning, a known method about the machine learning (e.g., recursive neural networks, state space models, etc.) suitable for learning time-series data can be used.

Figure 5:
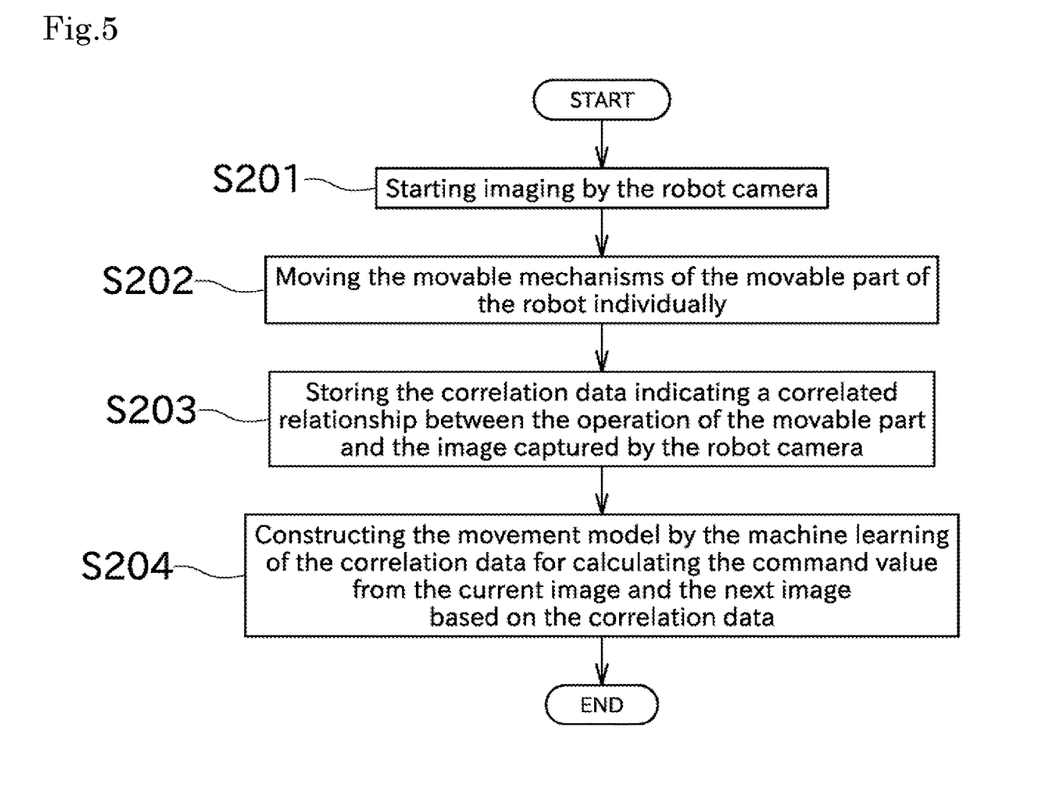
FIG. 5 A flow chart showing processes of constructing a movement model.

Next, referring to FIG. 5, a second prior treatment of constructing a movement model by the machine learning will be described. FIG. 5 is a flow chart showing processes of constructing the movement model. The second prior treatment is performed using the robot 10 and the robot camera 31. The second prior treatment is a process for constructing the movement model for outputting a command value of the movable part 12 based on the above current image and the next image.

The controller 20 starts imaging by the robot camera 31 attached to the robot 10 (S201). All the movable mechanisms (joints) of the movable part 12 of the robot 10 are individually operated (S202). Thus, data for indicating a correlated relationship between the operation of each of the movable mechanisms of the movable part 12 and the image captured by the robot camera 31 (change of the image), which is correlation data, is created. The controller 20 stores the correlation data (S203).

The correlation data contains, for example, data indicating how the feature point of the image moves according to the joints to be moved, the direction to be moved, and the amount to be moved of the movable part 12. Thus, by the machine learning of the correlation data, the movement model can be constructed, in the movement model, moving the feature point of the image in one direction is an input (in other words, the input is the current image and the next image) and the command value to be transmitted to the movable part 12 for implementing that is an output (S204). Thus, the second prior treatment is completed. By using the movement model, the movable part 12 can be controlled without using a detection value of a sensor that detects the position and the direction of the movable part 12.

Figure 6:
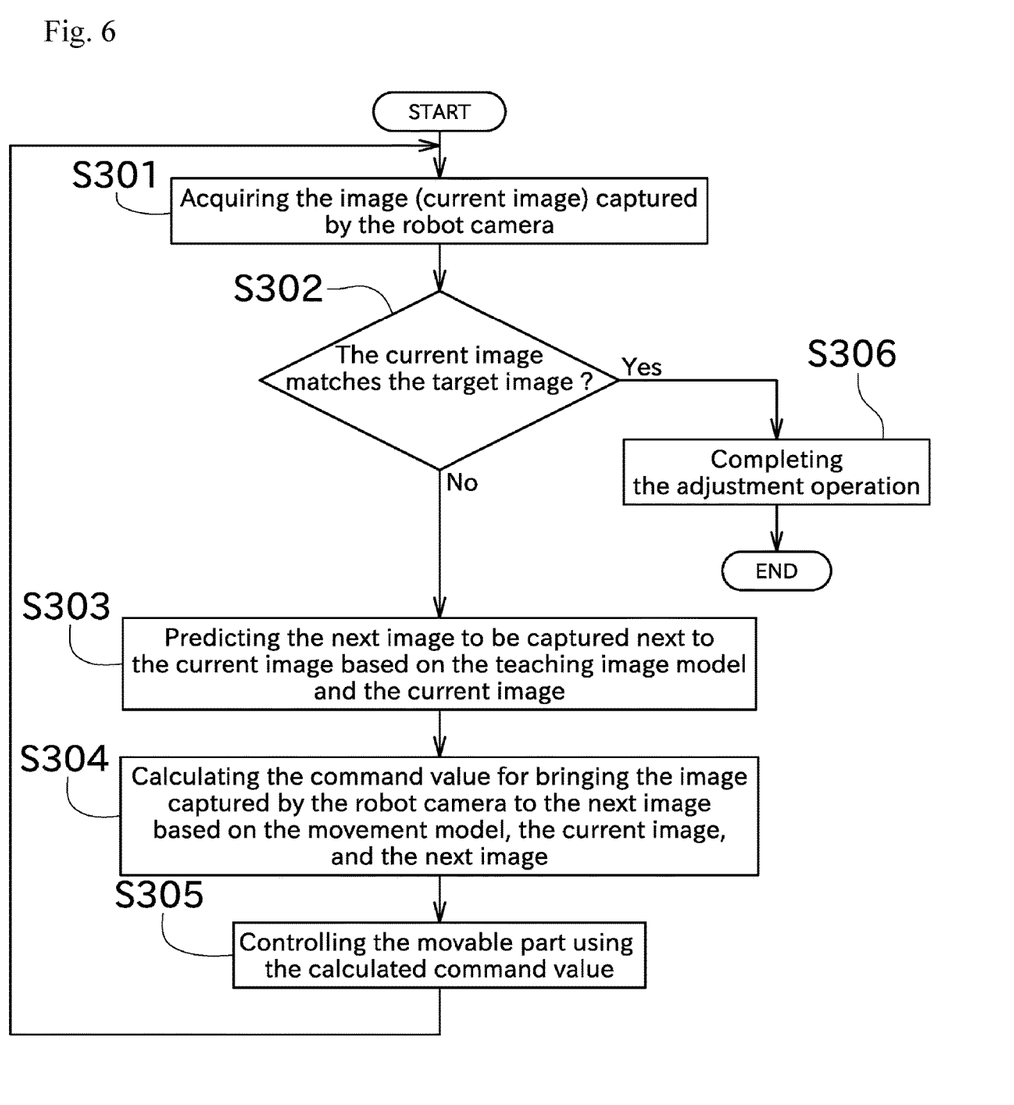
FIG. 6 A flowchart showing processes of performing an adjustment operation using the teaching image model and the movement model.

Next, processes of performing an adjustment operation using the teaching image model and the movement model will be described with reference to FIG. 6. FIG. 6 is a flow chart showing these processes.

Before or after the beginning of the operation by the robot 10, the controller 20 (the image acquisition part 21) acquires the current image captured by the robot camera 31 (S301, the image acquisition process). Next, the controller 20 determines whether or not the current image matches a target image (S302). The target image is an image to be acquired by the robot camera 31 when the adjustment operation by the movable part 12 is completed and the target image is an image created based on the teaching image at the completion of the adjustment operation.

If the current image does not coincide with the target image, the controller 20 (the image prediction part 22) predicts, based on the teaching image model and the current image, the next image (the image to be acquired by the image acquisition part 21) which is the image to be imaged by the robot camera 31 next to the current image (S303, the image prediction process).

Next, the controller 20 (the operation controller 24) calculate, based on the movement model, the current image, and the next image, a command value for bringing the image captured by the robot camera 31 to the next image (S304). The controller 20 (the operation controller 24) controls the movable part 12 using the calculated command value (S305, the operation control process).

Next, the controller 20 performs process of S301 again. That is, the control unit 20 predicts repeatedly the next image from the current image until the current image matches the target image, and controls the movable unit 12 with a command value for causing the image captured by the robot camera 31 to approach the next image. The adjustment operation is completed when the current image matches the target image (S306).]

Further, the robot camera 31 is the high-speed camera as described above, a new image is imaged every 1 to 2 msec. Correspondingly, processes from step S301 to step S305 is every 1 to 2 msec cycle. By making the control cycle very short in this manner, even if environmental changes, overshoot, or the like occur, it is possible to immediately perform correction. If the time period for adjusting the image acquired by the robot camera 31 to the next image is longer than the cycle, the process of S303 may be performed at a cycle slower than the control cycle.

Figure 7:
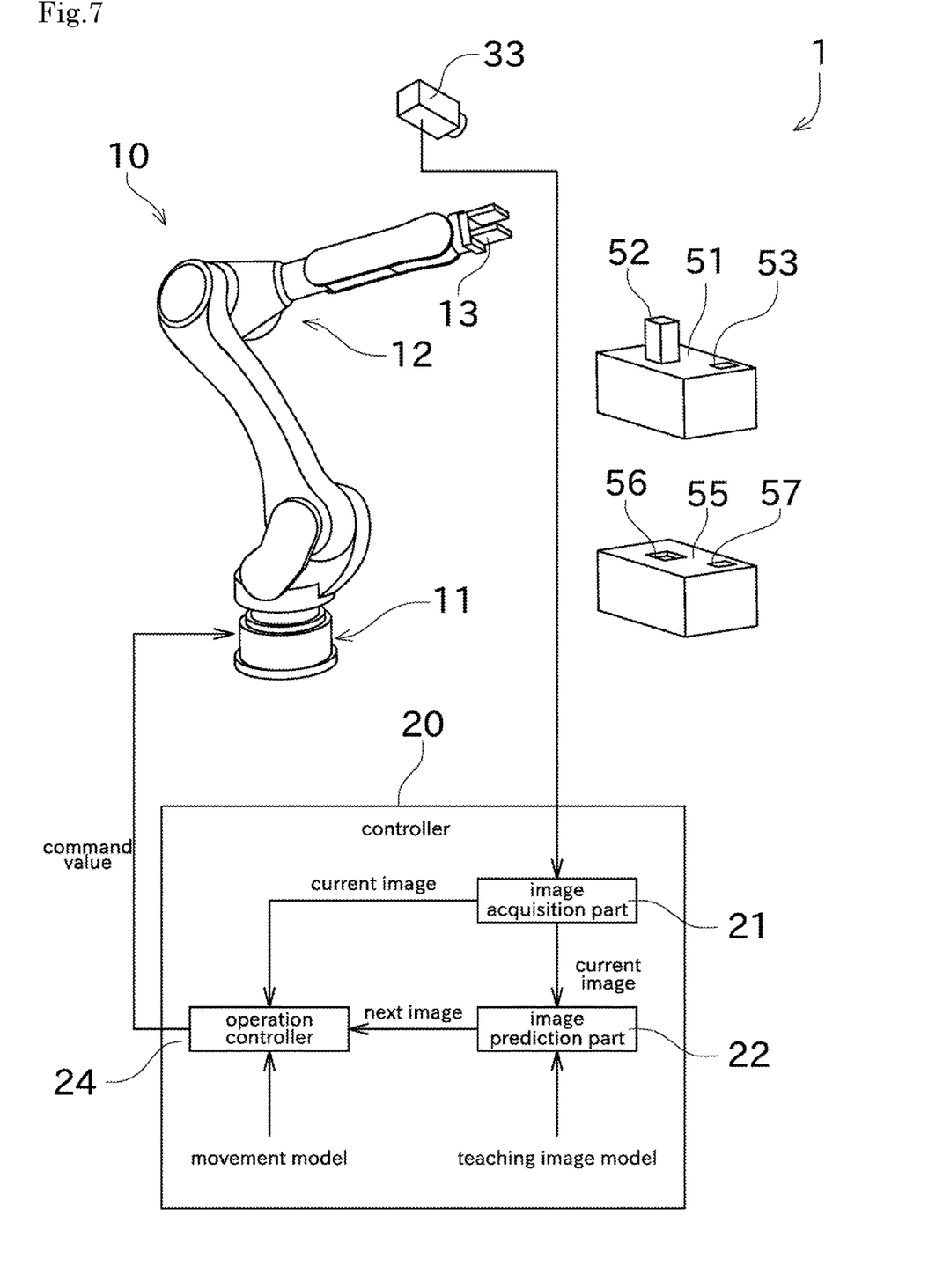
FIG. 7 A block diagram showing a configuration of a robot system according to a second embodiment.

Next, the second embodiment will be described with reference to FIG. 7. FIG. 7 is a block diagram showing the configuration of the robot system 1 according to the second embodiment. In below explanation, members identical or similar to those of the above embodiment will be given the same reference signs on the drawings, and their descriptions may be omitted.

In the first embodiment, it is the configuration to attach the robot camera 31 to the movable part 12, but in the second embodiment, an environmental camera 33 is attached to the outside of the robot 10. The environmental camera 33 may be mounted, for example, on a plant ceiling, column, or on a dedicated member for attaching the environmental camera 33. That is, the environmental camera 33 is mounted in a position where the environmental camera 33 does not move even when the movable part 12 is operated.

The environmental camera 33 is arranged so as to be able to image the area including the end effector 13. Further, the environmental camera 33 is also the high-speed camera the same as the robot camera 31. The environmental camera 33, like the robot camera 31, is used to image the image to obtain the correlation data to construct the movement model, or to image the current image in the operation. In the second embodiment, unlike the first embodiment, the environmental camera 33 is also used for the teaching image shooting.

The angle at which the teaching image is imaged is preferably the same as the angle of the image imaged during the operation of the robot 10. Therefore, in the second embodiment, the teaching is performed by using the environmental camera 33. Specifically, after starting the imaging by the environmental camera 33, as in the first embodiment, to change the position and the direction of the teaching tool 70 along the operation steps to be performed by the robot 10 by grasping the teaching tool 70. As a result, the teaching image is imaged by the environmental camera 33. In the second embodiment, the teaching camera 32 need not be provided in the teaching tool 70.

The second embodiment and the first embodiment is basically same except that the current image is imaged by the environmental camera 33 and the angle of the predicted next image is the angle of the environmental camera 33. By using the environmental camera 33 as in the second embodiment, there is no need to attach the robot camera 31 to the robot 10. Therefore, the second embodiment is preferable in the case where imaging by the robot camera 31 is difficult (for example, in the case where there is a possibility that lenses of the robot camera 31 are contaminated by painting or the like).

As described above, the robot system 1 includes the robot 10, the image acquisition part 21, the image prediction part 22, and the operation controller 24. The robot 10 has the end effector 13 and the movable part 12. The movable part 12 performs the adjustment operation for adjusting at least one of the position and the direction of the end effector 13 when the end effector 13 performs the operation. The image acquisition part 21 acquires the current image which is the image captured by the environmental camera 33 which is arranged so as to be able to image the image captured by the robot camera 31 which is arranged to move with the end effector 13 or the range including the end effector 13 (the image acquisition process). The image prediction part 22 predicts the next image which is the image to be captured by the robot camera 31 or the environmental camera 33 based on the teaching image model and the current image. The teaching image model is constructed by the machine learning of the teaching image which is predicted to capture by the robot camera 31 or the environmental camera 33 while the movable part 12 performs the adjustment operation (the image prediction process). The operation controller 24 calculates the command value for operating the movable part 12 so that the image captured by the robot camera 31 or the environmental camera 33 approaches the next image, and controls the movable part 12 based on the command value (the operation control process). The controller 20 executes the robot control method for controlling the robot 10 as described above.

As a result, the teaching to the robot can be performed by using the teaching image, so that the program related to the teaching to the robot can be eliminated or the labor of the program can be reduced. In addition, since the next image is predicted from the current image based on the teaching image model obtained by the machine learning, rather than operating the robot as determined in advance, it is possible to flexibly cope with environmental changes.

In the robot system 1 of the present embodiment, the operation controller 24 calculates the command value based on the movement model, the current image, and the next image. The movement model is constructed by the machine learning of the correlation relationship between the operation of the movable part 12 and the image captured by the robot camera 31 or the environmental camera 33.

Thus, by constructing the movement model by the above machine learning, the appropriate command value can be calculated for various combinations of the current image and the next image.

In the robot system 1 of the present embodiment, the teaching image includes a feature point that is moved with the adjustment operation, the teaching image model is constructed by the machine learning of the position change of the feature point.

This makes it possible to construct the teaching image models capable of predicting the appropriate next image even when the number of the teaching image is few, since the object of the machine learning becomes clear.

In the robot system 1 of this embodiment, the variation area and the convergence area are set in the teaching image model. The tolerance amount of controlling the movable part of the variation area is larger than that of the convergence area.

As a result, it is possible to distinguish a portion that requires precise operation from a portion that does not require precise operation, and to cause the robot 10 to perform the operation with an accuracy corresponding thereto. Therefore, even if the environment is slightly different between the teaching time and the operation time, the robot 10 can be made to the operation flexibly in response to the change of the environment as long as the position change of the feature point is allowed.

In the robot system 1 of the present embodiment, the areas are divided into the variation area and the convergence based on at least one of the coincidence degree of the feature point in a plurality of the teaching images, and the rate of the position change of the feature point in the teaching image.

As a result, since the variation area and the convergence area can be segmented based on the features included in the teaching image, the labor can be reduced as compared with when a person designates the division of the area.

In the robot system 1 of the present embodiment, the teaching image is the image acquired when the teaching tool 70 different from the robot 10 is moved in accordance with the procedure at the time of the operation.

This allows the teaching image to be obtained in an intuitive manner without actually moving the robot 10.

In the robot system 1 of the present embodiment, the cycle in which the robot camera 31 or the environmental camera 33 captures the image and the cycle in which the operation controller 24 calculates the command value are 10 msec or less.

Thus, since the command value can be calculated while acquiring the image with a very high-speed cycle, precise the operation can be performed to the robot 10 by immediately correcting the positional deviation or the like of the movable part 12.

In the robot system 1 of the present embodiment, the image prediction part 22 predicts the next image based on the current image without using a detection value of a sensor for detecting the position and the direction of the movable part 12.

Since the teaching is performed based on the image without using the detection value of the sensor, the position of the movable part 12 is controlled by considering the position relative to the object to be operated, so that it can more flexibly cope with environmental changes.

Although a preferred embodiment of the present invention has been described above, the configuration above can be modified, for example, as follows.

The configuration of the robot 10 described above is an example, and the present invention can be applied to a robot having a configuration different from the robot 10 of the above-described embodiment. For example, the movable part 12 may be a configuration that adjusts only one of the position and the direction of the end effector 13. The end effector 13 may be a configuration that can be used according to the type of the operation to be performed by the robot 10.

In the above embodiment, the controller 20 constructs the teaching image model and the movement model, however a device other than the controller 20 (i.e., a computer different from the robot system 1) may do it. In this case, the teaching image and the movement model constructed by the other computer are applied to the controller 20 and the image prediction part 22 and the operation controller 24 process based on them.

In the above embodiment, the command value to the movable part 12 is calculated based on the movement model constructed by the machine learning, but when the movement of the movable part 12 is simple, for example the movable part 12 has a small number of joints, an appropriate command value can be calculated based only on the above-described correlation data without performing the machine learning.

The flowcharts of FIGS. 2, 5, and 6 are exemplary, and the order of process may be changed, some process may be omitted, other process may be added, and two process may be performed in parallel.

REFERENCE SIGNS LIST 1 robot system
10 robot
11 support part
12 movable part
13 end effector (operation tool)
20 controller
21 image acquisition part
22 image prediction part
24 operation controller
31 imaging device

The invention claimed is:

1. A method for controlling a robot, the robot including an operation tool and a movable part, the movable part performing an adjustment operation adjusting at least one of a position and a direction of the operation tool while the operation tool performs an operation to a workpiece, the method comprising:
an image acquisition process of acquiring a current image which is an image captured by an imaging device arranged so that the imaging device moves with the operation tool or the imaging device is arranged to capture an image of an area including the operation tool;
an image prediction process of predicting a next image, which is an image to be subsequently captured by the imaging device, the next image being predicted based on only a teaching image model and the current image, the teaching image model being constructed by a machine learning of a teaching image which is predicted to be captured by the imaging device while the movable part performs the adjustment operation; and
an operation control process of calculating a command value causing the movable part to move so that the image captured by the imaging device approaches the predicted next image, and controlling the movable part based on the calculated command value, wherein:
the image acquisition process, the image prediction process, and the operation control process are performed repeatedly, the teaching image for constructing the teaching image model includes a feature point hat changes position with the adjustment operation, the teaching image model is constructed by the machine learning of position change of the feature point, and the teaching image model outputs the next image based on information about change tendency between the current image and the next image when only the current image is input to the teaching image model.

2. A robot system comprising:

a robot including an operation tool and a movable part, the movable part performing an adjustment operation adjusting at least one of a position and a direction of the operation tool while the operation tool performs an operation to a workpiece; and a controller configured to:

acquire a current image which is an image captured by an imaging device, the imaging device being arranged so that the imaging device moves with the operation tool or the imaging device being arranged to capture an image of an area including the operation tool;

predict a next image, which is an image to be subsequently captured by the imaging device, the next image being predicted based on only a teaching image model and the current image, the teaching image model being constructed by a machine learning of a teaching image which is predicted to be captured by the imaging device while the movable part performs the adjustment operation;

calculate a command value causing the movable part to move so that the image captured by the imaging device approaches the predicted next image; and control the movable part based on the calculated command value, wherein:

the teaching image for constructing the teaching image model includes a feature point that changes position with the adjustment operation, the teaching image model is constructed by the machine learning of position change of the feature point, and the teaching image model outputs the next image based on information about change tendency between the current image and the next image when only the current image is input to the teaching image model.

3. The robot system according to claim 2, wherein the controller calculates the command value based on a movement model, the current image, and the next image, the movement model being constructed by a machine learning of a correlation relationship between a movement of the movable part and the image captured by the imaging device.

4. The robot system according to claim 2, wherein:

a variation area and a convergence area are set in the teaching image model, and a tolerance amount of controlling the movable part within the variation area is larger than a tolerance amount of controlling the movable part within the convergence area.

5. The robot system according to claim 4, wherein the variation area and the convergence area are segmented based on at least one of coincidence degree of the feature point in the teaching image and a rate of position change of the feature point in the teaching image.

6. The robot system according to claim 2, wherein the teaching image is an image acquired when moving the operation tool different from the robot in accordance with the controller.

7. The robot system according to claim 1, wherein a cycle in which the imaging device captures the image and a cycle in which the operation controller calculates the command value are 10 milliseconds or less.

8. The robot system according to claim 2, wherein the controller predicts the next image based on the current image without using a detection value of a sensor, which detects the position and a direction of the movable part.

9. The robot system according to claim 7, wherein a cycle in which the controller predicts the next image based on the current image is 10 milliseconds or less.

* * * * *